(12) United States Patent
Kim et al.

(10) Patent No.: US 9,946,960 B1
(45) Date of Patent: Apr. 17, 2018

(54) METHOD FOR ACQUIRING BOUNDING BOX CORRESPONDING TO AN OBJECT IN AN IMAGE BY USING CONVOLUTIONAL NEURAL NETWORK INCLUDING TRACKING NETWORK AND COMPUTING DEVICE USING THE SAME

(71) Applicant: StradVision, Inc., Gyeongsangbuk-do (KR)

(72) Inventors: Yongjoong Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 15/783,442

(22) Filed: Oct. 13, 2017

(51) Int. Cl.
    *G06K 9/00*     (2006.01)
    *G06K 9/62*     (2006.01)
    (Continued)

(52) U.S. Cl.
    CPC ......... *G06K 9/6256* (2013.01); *G06K 9/4642* (2013.01); *G06K 9/6202* (2013.01);
    (Continued)

(58) Field of Classification Search
    CPC .. G06N 3/08; G06N 3/02; G06K 9/66; G06K 9/6256; G06K 9/4604; G06K 9/00288;
    (Continued)

(56) References Cited

PUBLICATIONS

Yang, Yurong, et al. "Aerial Target Tracking Algorithm Based on Faster R-CNN Combined with Frame Differencing." Aerospace 4.2 (Jun. 20, 2017): 32.*

(Continued)

*Primary Examiner* — Stephen R Koziol
*Assistant Examiner* — Raphael Schwartz
(74) *Attorney, Agent, or Firm* — Husch Blackwell LLP (57) ABSTRACT

A method for acquiring a bounding box corresponding to an object is provided. The method includes steps of: (a) acquiring proposal boxes; (b) selecting specific proposal box among the proposal boxes by referring to (i) a result of comparing distance between a reference bounding box and the proposal boxes and/or (ii) a result of comparing score which indicates whether the proposal boxes includes the object, and then setting the specific proposal box as a starting area of a tracking box; (c) determining a specific area of the current frame as a target area of the tracking box by using the mean shift tracking algorithm; and (d) allowing a pooling layer to generate a pooled feature map by applying pooling operation to an area corresponding to the specific area and then allowing a FC layer to acquire a bounding box by applying regression operation to the pooled feature map.

20 Claims, 7 Drawing Sheets

(51) Int. Cl.
    *G06T 7/246* (2017.01)
    *G06K 9/46* (2006.01)
    *G06N 3/04* (2006.01)
    *G06N 3/08* (2006.01)
(52) U.S. Cl.
    CPC ......... *G06K 9/6215* (2013.01); *G06K 9/6267* (2013.01); *G06N 3/04* (2013.01); *G06N 3/08* (2013.01); *G06T 7/248* (2017.01); *G06K 2209/21* (2013.01); *G06T 2210/12* (2013.01)
(58) Field of Classification Search
    CPC .... G06K 9/00744; G06K 9/46; G06K 9/6267; G06T 2207/20081; G06T 2207/20084; G06T 3/4046
    See application file for complete search history.

(56) References Cited

PUBLICATIONS

Ren, Shaoqing, et al. "Faster R-CNN: Towards real-time object detection with region proposal networks." Advances in neural information processing systems. 2015.*
Girshick, Ross. "Fast r-cnn." Proceedings of the IEEE international conference on computer vision. 2015.*
Zhang, Yongjie, Jian Wang, and Xin Yang. "Real-time vehicle detection and tracking in video based on faster R-CNN." Journal of Physics: Conference Series. vol. 887. No. 1. IOP Publishing, Sep. 8, 2017.*

* cited by examiner

METHOD FOR ACQUIRING BOUNDING BOX CORRESPONDING TO AN OBJECT IN AN IMAGE BY USING CONVOLUTIONAL NEURAL NETWORK INCLUDING TRACKING NETWORK AND COMPUTING DEVICE USING THE SAME

FIELD OF THE INVENTION

The present invention relates to a method for acquiring a bounding box corresponding to an object in a test image by using a convolutional neutral network (CNN) including a tracking network and a testing device using the same; and more particularly, to a method for acquiring at least one bounding box corresponding to at least one object in a test image by using a CNN including a tracking network, including steps of: (a) the testing device acquiring or supporting another device to acquire multiple proposal boxes, if feature map is generated as a result of applying convolution operation to the test image as a current frame, and then information on the multiple proposal boxes by applying certain operation to the feature map by a Region Proposal Network (RPN) is outputted; (b) the testing device selecting or supporting another device to select at least one specific proposal box among the multiple proposal boxes by referring to at least either of (i) a result of comparing each distance between a reference bounding box of the object in a previous frame and each of the multiple proposal boxes and (ii) a result of comparing each of scores as probability values which indicates whether each of the proposal boxes includes the object, and then setting or another device to set the specific proposal box as a starting area of a tracking box, wherein the starting area is used for a mean shift tracking algorithm; (c) the testing device determining or supporting another device to determine a specific area of the current frame having information on probability similar to that corresponding to pixel data of the object in the previous frame as a target area of the tracking box by using the mean shift tracking algorithm; and (d) the testing device allowing a pooling layer to generate a pooled feature map by applying pooling operation to an area in the feature map corresponding to the specific area and then allowing a FC layer to acquire a bounding box by applying regression operation to the pooled feature map; and the testing device performing the same.

BACKGROUND OF THE INVENTION

In Machine Learning, a convolutional neural network (CNN or ConvNet) is a class of deep, feed-forward artificial neural network that has successfully been applied to analyzing visual imagery.

Figure 1:
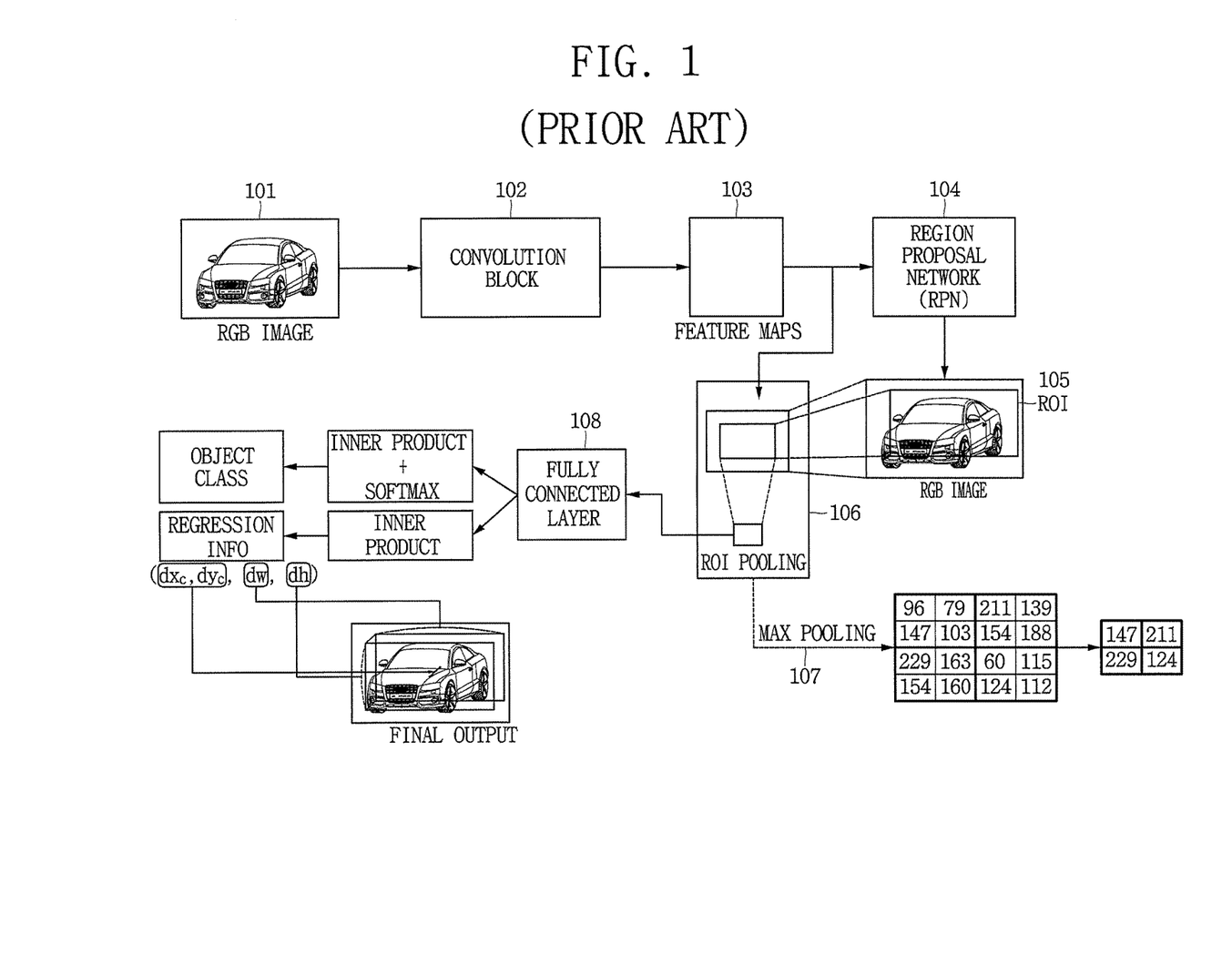
FIG. 1 is a drawing exemplarily illustrating a learning process of a conventional CNN according to prior art.

FIG. 1 is a drawing schematically illustrating a learning process of a conventional CNN according to prior art.

Specifically, FIG. 1 shows a process of acquiring losses by comparing a predicted bounding box with a Ground Truth (GT) bounding box. Herein, the losses stand for differences between the predicted bounding box and the GT bounding box, and are denoted as $dx_c$, $dy_e$, dw, dh as shown in FIG. 1.

First, as illustrated in FIG. 1, the learning device may acquire an RGB image as an input to be fed into a plurality of convolutional layers, i.e., convolutional filters, included in a convolution block. A size, e.g., a width and a height, of the RGB image becomes smaller while the number of channels is incremented as the RGB image passes through the plurality of convolutional layers.

As illustrated in FIG. 1, the learning device allows a Region Proposal Network (RPN) to generate proposal boxes from an ultimate feature map outputted by the convolution block and allows a pooling layer, e.g., ROI pooling layer, to resize areas on the feature map corresponding to the proposal boxes to a predetermined size, e.g., a size of 2×2, by applying a max pooling operation (or an average pooling operation) to pixel data of the areas on the feature map corresponding to the proposal boxes. As a result, a pooled feature map is acquired. For a reference, the pooled feature map may also be referred to as a feature vector. Herein, the max pooling operation is an operation by which each maximum value in each of sub-regions divided from a subject area on a feature map is selected as each of representative values for the subject area, as shown in the bottom right of FIG. 1.

Next, the pooled feature map may be allowed to be fed into a fully connected (FC) layer.

Then, the learning device may allow the FC layer to recognize a category of an object in the RGB image. In addition, the predicted bounding box in the RGB image may be acquired through the FC layer, and the losses may also be acquired by comparing between the predicted bounding box and the ground truth (GT) bounding box. Herein, the GT bounding box represents a bounding box precisely surrounding the object in the RGB image, which may usually be prepared by a human being.

Lastly, the learning device in FIG. 1 may adjust at least one of parameters included in the FC layer, the RPN, or the plurality of convolutional layers by using the losses during a backpropagation process.

Thereafter, a testing device (not illustrated) having the CNN with the adjusted parameters may acquire a bounding box surrounding an object in a test image, later. However, even if the testing device has the CNN with the adjusted parameters, it is very difficult to obtain the bounding box precisely surrounding the object in the test image.

Accordingly, the applicant of the present invention proposes a method for acquiring at least one bounding box corresponding to at least one object in a test image with high precision.

SUMMARY OF THE INVENTION

It is an object of the present invention to solve the problems described above.

It is another object of the present invention to provide a method using a tracking network included in a CNN to acquire a bounding box of high precision corresponding to an object in an image.

It is still another object of the present invention to track the object more accurately by using the mean-shift tracking algorithm.

It is still yet another object of the present invention to increase reliability of tracking results along with validation results by making the tracking network reuse a classifier and a regressor included in a detection network in the CNN.

In accordance with one aspect of the present invention, there is provided a method for acquiring at least one bounding box corresponding to at least one object in a test image by using a CNN including a tracking network, including steps of: (a) a testing device acquiring or supporting another device to acquire multiple proposal boxes, if feature map is generated as a result of applying convolution operation to the test image as a current frame, and then information on the multiple proposal boxes by applying certain operation to the feature map by a Region Proposal Network (RPN) is outputted; (b) the testing device selecting or supporting another device to select at least one specific proposal box among the multiple proposal boxes by referring to at least either of (i) a result of comparing each distance between a reference bounding box of the object in a previous frame and each of the multiple proposal boxes and (ii) a result of comparing each of scores as probability values which indicates whether each of the proposal boxes includes the object, and then setting or another device to set the specific proposal box as a starting area of a tracking box, wherein the starting area is used for a mean shift tracking algorithm; (c) the testing device determining or supporting another device to determine a specific area of the current frame having information on probability similar to that corresponding to pixel data of the object in the previous frame as a target area of the tracking box by using the mean shift tracking algorithm; and (d) the testing device allowing a pooling layer to generate a pooled feature map by applying pooling operation to an area in the feature map corresponding to the specific area and then allowing a FC layer to acquire a bounding box by applying regression operation to the pooled feature map.

In accordance with another aspect of the present invention, there is provided a method for acquiring bounding boxes corresponding to objects in a test image by using a CNN including a tracking network and a detection network, including steps of: (a) a testing device acquiring or supporting another device to acquire multiple proposal boxes, if feature map is generated as a result of applying convolution operation to the test image as a current frame, and then information on the multiple proposal boxes by applying certain operation to the feature map by a Region Proposal Network (RPN) is outputted; (b) the testing device (b-1) selecting or supporting another device to select at least one specific proposal box among the multiple proposal boxes by referring to at least either of (i) a result of comparing each distance between a reference bounding box of the object in a previous frame and each of the multiple proposal boxes and (ii) a result of comparing each of scores as probability values which indicates whether each of the proposal boxes includes the object, and then setting or another device to set the specific proposal box as a starting area of a tracking box, wherein the starting area is used for a mean shift tracking algorithm; and (b-2) setting or supporting another device to set at least some of the proposal boxes which have not been set as the tracking box among the multiple proposal boxes as multiple untracked boxes; and (c) (c-1) the testing device, after the step of (b-1), determining or supporting another device to determine a specific area of the current frame having information on probability similar to that corresponding to pixel data of the object in the previous frame as a target area of the tracking box by using the mean shift tracking algorithm; and allowing a first pooling layer to generate a first pooled feature map by applying pooling operation to an area in the feature map corresponding to the specific area and then allowing a FC layer to acquire a first bounding box by applying regression operation to the first pooled feature map; and (c-2) the testing device, after the step of (b-2), allowing a second pooling layer to generate a second pooled feature map by applying pooling operation to an area on the feature map corresponding to at least one of the multiple untracked boxes; and, if the FC layer detects a new object by applying classification operation to the second pooled feature map, allowing the FC layer to acquire a second bounding box by applying regression operation to the second pooled feature map.

In accordance with still another aspect of the present invention, there is provided a testing device for acquiring at least one bounding box corresponding to at least one object in a test image by using a CNN including a tracking network, including: a communication part for acquiring the test image or feature map converted therefrom; and a processor for performing processes of (I) acquiring or supporting another device to acquire multiple proposal boxes, if the feature map is acquired as a result of applying convolution operation to the test image as a current frame, and then information on the multiple proposal boxes by applying certain operation to the feature map by a Region Proposal Network (RPN) is outputted; (II) selecting or supporting another device to select at least one specific proposal box among the multiple proposal boxes by referring to at least either of (i) a result of comparing each distance between a reference bounding box of the object in a previous frame and each of the multiple proposal boxes and (ii) a result of comparing each of scores as probability values which indicates whether each of the proposal boxes includes the object, and then setting or another device to set the specific proposal box as a starting area of a tracking box, wherein the starting area is used for a mean shift tracking algorithm; (III) determining or supporting another device to determine a specific area of the current frame having information on probability similar to that corresponding to pixel data of the object in the previous frame as a target area of the tracking box by using the mean shift tracking algorithm; and (IV) allowing a pooling layer to generate a pooled feature map by applying pooling operation to an area in the feature map corresponding to the specific area and then allowing a FC layer to acquire a bounding box by applying regression operation to the pooled feature map.

In accordance with still yet another aspect of the present invention, there is provided a testing device for acquiring bounding boxes corresponding to objects in a test image by using a CNN including a tracking network and a detection network, including: a communication part for acquiring the test image or feature map converted therefrom; and a processor for performing processes of (I) acquiring or supporting another device to acquire multiple proposal boxes, if the feature map is generated as a result of applying convolution operation to the test image as a current frame, and then information on the multiple proposal boxes by applying certain operation to the feature map by a Region Proposal Network (RPN) is outputted; (II) (II-1) selecting or supporting another device to select at least one specific proposal box among the multiple proposal boxes by referring to at least either of (i) a result of comparing each distance between a reference bounding box of the object in a previous frame and each of the multiple proposal boxes and (ii) a result of comparing each of scores as probability values which indicates whether each of the proposal boxes includes the object, and then setting or another device to set the specific proposal box as a starting area of a tracking box, wherein the starting area is used for a mean shift tracking algorithm; and (II-2) setting or supporting another device to set at least some of the proposal boxes which have not been set as the tracking box among the multiple proposal boxes as multiple untracked boxes; and (III) (III-1) after the process of (II-1), determining or supporting another device to determine a specific area of the current frame having information on probability similar to that corresponding to pixel data of the object in the previous frame as a target area of the tracking box by using the mean shift tracking algorithm; and allowing a first pooling layer to generate a first pooled feature map by applying pooling operation to an area in the feature map corresponding to the specific area and then allowing a FC layer to acquire a first bounding box by applying regression operation to the first pooled feature map; and (III-2) the testing device, after the process of (II-2), allowing a second pooling layer to generate a second pooled feature map by applying pooling operation to an area on the feature map corresponding to at least one of the multiple untracked boxes; and, if the FC layer detects a new object by applying classification operation to the second pooled feature map, allowing the FC layer to acquire a second bounding box by applying regression operation to the second pooled feature map.

BRIEF DESCRIPTION OF THE DRAWINGS

The drawings attached below are to explain example embodiments of the present invention and are only part of preferred embodiments of the present invention. Other drawings may be obtained based on the drawings herein without inventive work for those skilled in the art. The above and other objects and features of the present invention will become conspicuous from the following description of preferred embodiments given in conjunction with the accompanying drawings, in which.

DETAILED DESCRIPTION OF THE PREFERRED EMBODIMENTS

To make purposes, technical solutions, and advantages of the present invention clear, reference is made to the accompanying drawings that show, by way of illustration, more detailed example embodiments in which the invention may be practiced. These preferred embodiments are described in sufficient detail to enable those skilled in the art to practice the invention.

It is to be appreciated that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be appreciated that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Hereinafter, preferred embodiments of the present invention will be described in detail with reference to the accompanying drawings so that those skilled in the art may easily implement the present invention.

Figure 2:
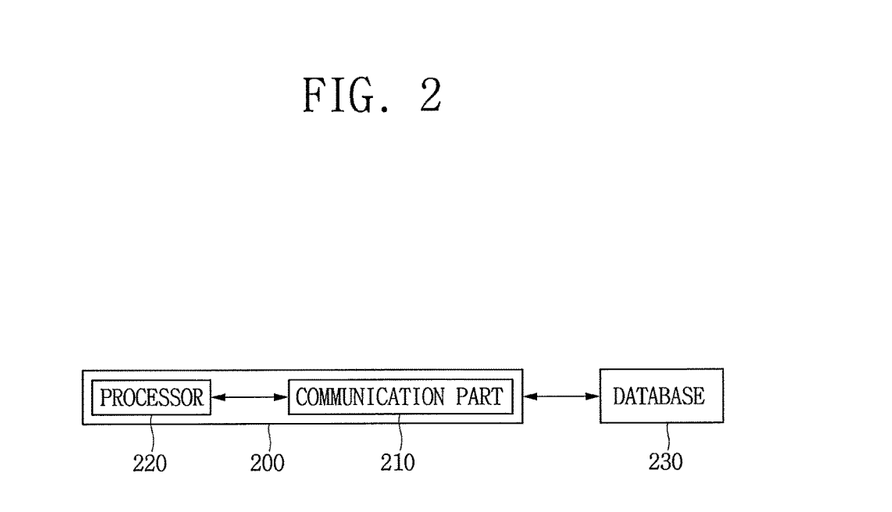
FIG. 2 is a block diagram schematically showing a testing device in accordance with one example embodiment of the present invention.

FIG. 2 is a block diagram schematically showing a testing device in accordance with one example embodiment of the present invention.

As illustrated in FIG. 2, the testing device 200 may include a communication part 210 and a processor 220. And, the testing device 200 may further include a database 230. As the case may be, the testing device 200 may not include the database 230 like FIG. 2. Herein, any digital computing device with at least one processor to perform operation may be adopted as the testing device 200 of the present invention.

The communication part 210 may be configured to acquire a test image or at least one feature map obtained therefrom.

The processor 220 may be configured to perform processes of (i) selecting at least one of proposal boxes, i.e., at least one specific proposal box, among all proposal boxes generated by an RPN with some criteria, (ii) setting the specific proposal box as a starting area of a tracking box, where the starting area is used for a tracking algorithm, e.g., mean-shift tracking algorithm, (iii) determining a specific area as a target area of the tracking box by using the mean shift tracking algorithm, and (iv) allowing a pooling layer to generate a pooled feature map by applying pooling operation to an area in the feature map corresponding to the specific area and then allowing a FC layer to acquire a bounding box by applying regression operation to the pooled feature map. More details with respect to the processes mentioned above are to be delineated in the following.

Meanwhile, the database 230 may be accessed by the communication part 210 of the testing device 200, and information on scores of the proposal boxes, information on a reference bounding box of an object in a previous frame, and information on parameters of a CNN etc. may be stored therein.

Figure 3A:
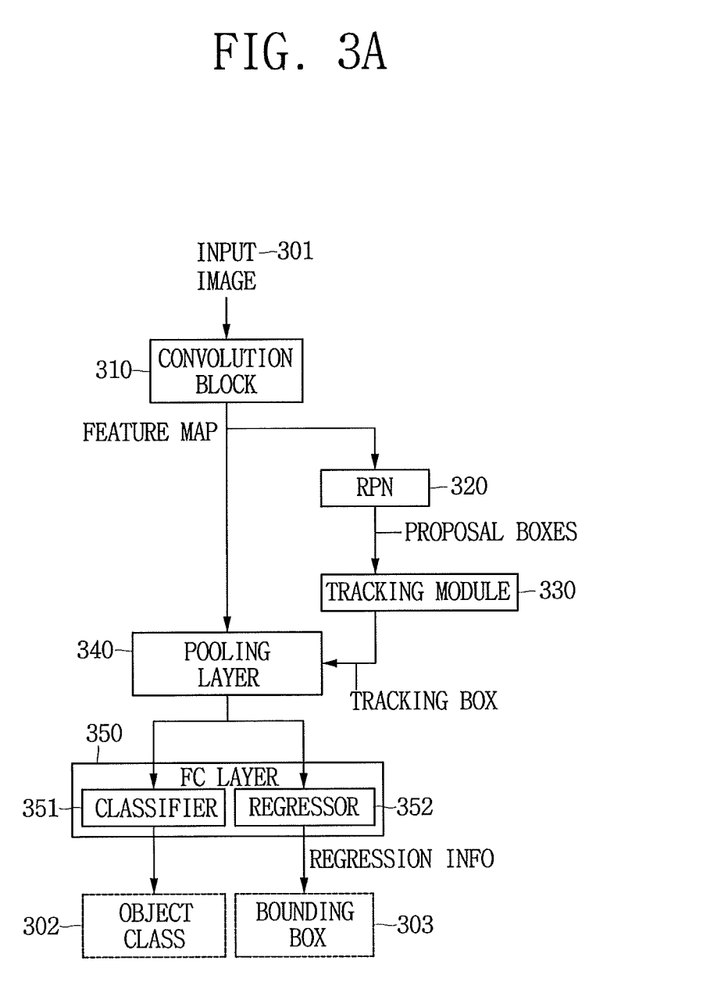
FIG. 3A is a block diagram exemplarily illustrating a configuration of a CNN capable of acquiring a bounding box in accordance with one example embodiment of the present invention.
Figure 3B:
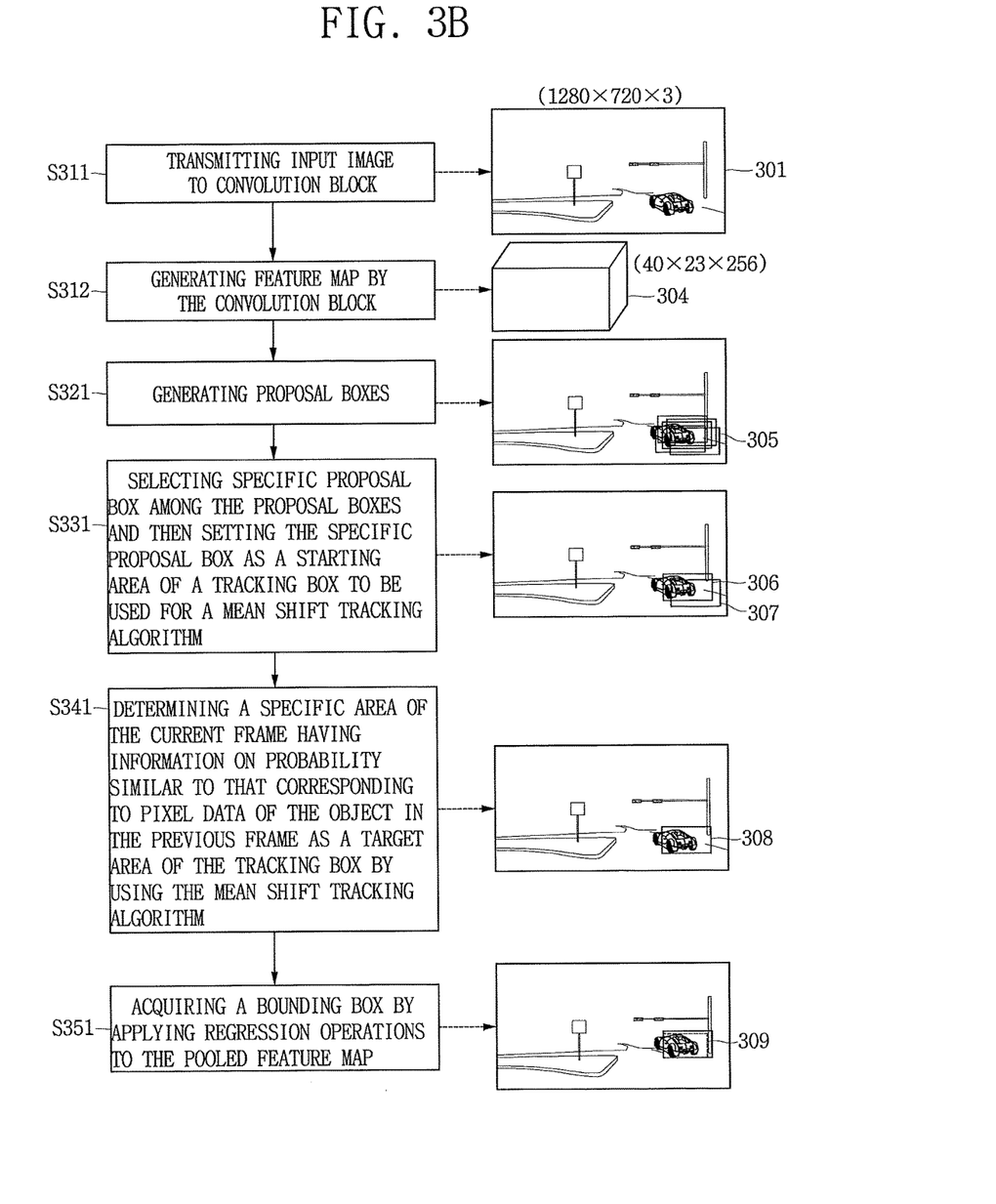
FIG. 3B is a flowchart showing processes of acquiring the bounding box by using the CNN including the tracking network in accordance with one example embodiment of the present invention.

FIG. 3A is a block diagram exemplarily illustrating a configuration of a CNN capable of acquiring the bounding box in accordance with one example embodiment of the present invention and FIG. 3B shows processes of acquiring the bounding box by using the CNN including the tracking network in accordance with one example embodiment of the present invention.

For a reference, the testing device 200 may be comprised of several other digital computing devices to perform each of functions or processes disclosed herein. Nonetheless, an assumption that the testing device 200 is implemented by a single digital computing device is made in the disclosure of the present invention for a convenience of descriptions and illustrations.

Referring to FIG. 3A, if an input image 301 is transmitted to a convolution block 310, at least one feature map is generated by applying at least one convolution operation to the input image 301. Then, the feature map is forwarded to the RPN 320 in order to generate the proposal boxes.

After transmitting the proposal boxes to a tracking module 330, at least one tracking box is acquired from the tracking module 330 by (i) selecting the specific proposal box among the proposal boxes with some criteria and (ii)

setting it as a starting area, i.e., an initial window, of the tracking box, where the starting area is used for a mean shift tracking algorithm. The detailed explanation on the criteria will be made later.

Next, a pooling layer 340 may receive (i) the feature map from the convolution block 310 and (ii) information on the tracking box from the tracking module 330, to thereby generate a pooled feature map by applying pooling operation to an area, corresponding to the tracking box, i.e., the ROI, in the feature map. Thereafter, a fully-connected (FC) layer 350 may recognize a class 302 of the object via a classifier 351 and may generate the bounding box 303 via a regressor 352, by using information on the pooled feature map.

Unlike the testing device 200 including the CNN illustrated in FIG. 3A which is comprised of the convolution block 310, the RPN 320, the tracking module 330, the pooling layer 340, and the FC layer 350, the CNN in the testing device 200 may include only a part of the convolution block 310, the RPN 320, the tracking module 330, the pooling layer 340, and the FC layer 360, as the case may be.

Referring to FIG. 3B with a configuration illustrated in FIG. 3A, the input image 301, e.g., the test image with a size of 1280×720 and 3 channels, is transmitted to the convolution block 310 at a step of S311 and as a result, the feature map 304 with a size of 40×23 and 256 channels may be generated by applying the convolution operation to the input image 301 at a step of S312. Herein, the input image 301 may be considered as a current frame.

For a reference, the convolution block 310 is comprised of one or more convolutional layers. Whenever a convolution operation is applied, a width and a height of the input may be reduced by a particular ratio and number of channels may be increased by the particular ratio, but it is not limited thereto. Herein, the particular ratio may be determined on a basis of parameters, i.e., weights, of the convolutional layers, included in the convolution block 310.

Moreover, the RPN 320 may generate information on the proposal boxes 305 from the feature map 304 at a step of S321. For a reference, the proposal boxes 305 are boxes each of which has a probability of including the object in the input image 301.

Further, the processor 220 of the testing device 200 selects the specific proposal box 306 among the multiple proposal boxes 305 by referring to at least either of (i) a result of comparing each distance between a reference bounding box 307 of the object in a previous frame and each of the proposal boxes 305 and (ii) a result of comparing each of scores as probability values which indicates a probability of each of the proposal boxes 305 including the object, and then the processor 220 of the testing device 200 sets the specific proposal box 306 as a starting area of a tracking box, at a step of S331. The starting area may be used for a mean shift tracking algorithm. Herein, although the reference bounding box 307 of the object is a bounding box located in the previous frame, FIG. 3B shows the reference box 307 on the current frame for the convenience of explanation.

For example, the processor 220 of the testing device 200 may determine the specific proposal box 306 to be one with the smallest distance, e.g., L2 distance, and/or with the highest score among respective scores of the proposal boxes 305 at a step of 331.

As another example, the processor 220 of the testing device 200 may determine the specific proposal box 306 to be one with the smallest ratio of L2 distance/score.

Herein, the score may be represented by a ratio of (i) a region corresponding to an intersection of an area of a GT bounding box and that of each of the proposal boxes 305 to (ii) a region corresponding to a union of the area of the GT bounding box and that of each of the proposal boxes 305. Accordingly, the score may be a value between 0 and 1. Thus, the probability value of the specific proposal box 306, selected among the proposal boxes 305, may be close to 1.

Meanwhile, the proposal boxes 305 may dedicate to only one same object. As another example, the proposal boxes 305 may dedicate to multiple objects. For example, if 100 proposal boxes are generated, 70 proposal boxes may be generated for an object A and 30 proposal boxes may be produced for an object B.

Then, the processor 220 of the testing device 200 may determine a specific area 308 in the current frame, having information on probability similar to that corresponding to pixel data of the object in the previous frame, as a target area of the tracking box by using the mean shift tracking algorithm at a step of S341.

Herein, the mean-shift tracking algorithm may be used by the tracking module 330, but it is conspicuous to those skilled in the art that tracking algorithm should not be limited thereto.

After acquiring the target area 308 of the tracking box, the pooled feature map (not shown), i.e., a feature vector, are generated by applying the pooling operation to an area, corresponding to the target area 308, in the feature map 304 and then the bounding box is generated by applying regression operation to the feature vector through the regressor 352 in the FC layer 350, and may a class, e.g., vehicle, pedestrian, road, building etc., of the object is identified by applying operation to the feature vector through the classifier 351 in the FC layer 350, at a step of S351. As a result, the bounding box with high precision may be acquired via the CNN including the tracking network.

For a reference, the testing device 200 may allow the tracking module 330 to precisely find the position of the tracking box 308 in the current frame and may instruct the FC layer 350 to refine a size of the tracking box to thereby acquire the bounding box closest to the GT bounding box.

Finally, the testing device 200 may determine the bounding box as a reference bounding box to be used for a tracking box of the object to be located in a next frame.

For reference, the configuration of FIG. 3A may be called as the tracking network.

In accordance with another example embodiment of the present invention, the CNN of the present invention may further include a detection network. Details regarding another example embodiment may be delineated in the following with illustrations of FIGS. 4A and 4B.

Figure 4A:
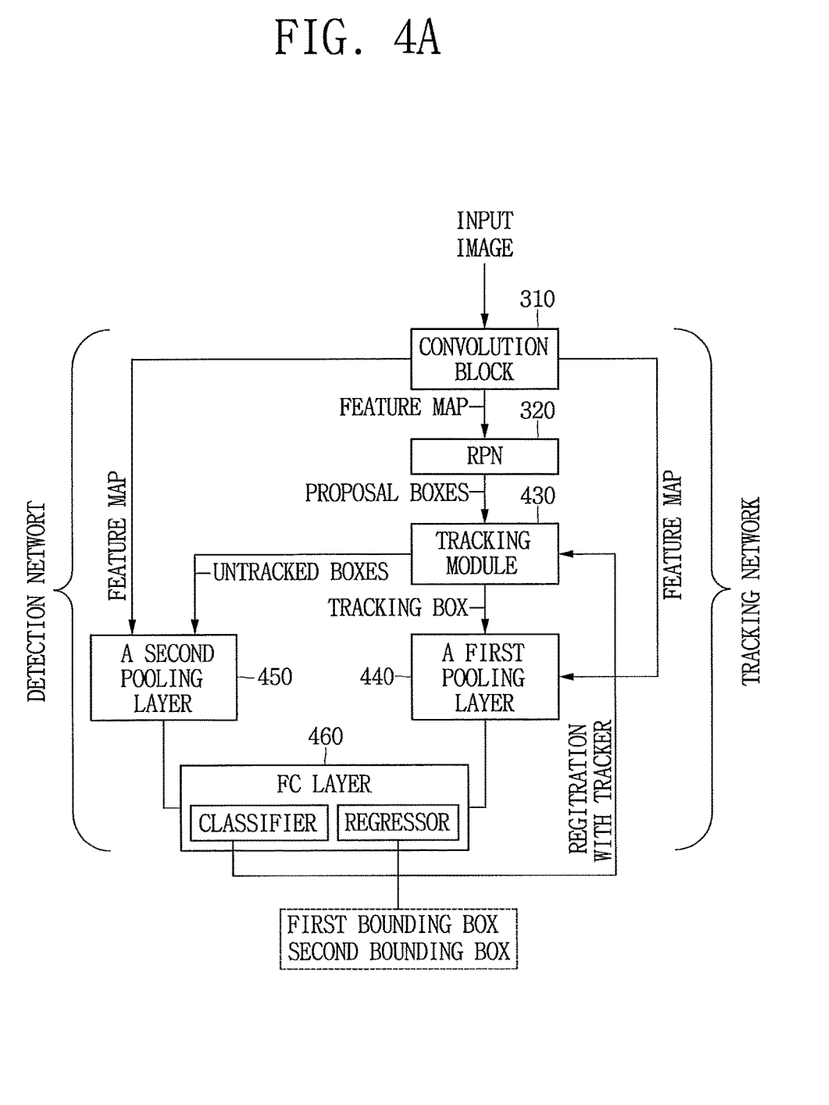
FIG. 4A is a block diagram exemplarily illustrating a configuration of a CNN capable of acquiring a bounding box in accordance with another example embodiment of the present invention.

FIG. 4A is a block diagram exemplarily illustrating a configuration of a CNN capable of acquiring a bounding box in accordance with another example embodiment of the present invention.

Referring to FIG. 4A, a configuration of the CNN included in the testing device 200 may be comprised of the tracking network and the detection network. The tracking network and the detection network may share the convolution block 310, the RPN 320 and an FC layer 460 with each other.

As the case may be, unlike FIG. 4A, the CNN may be comprised of separate FC layers for each network. That is, the CNN may not share adjusted parameters between the separate FC layers. Such CNN may have a first FC layer for the tracking network and a second FC layer for the detection network.

For reference, in the claims of the present invention, a word "FC layer" is used without separating the first FC layer and the second FC layer, but it does not mean that the word "FC layer" used in the claims of the present invention excludes the case of separating the first FC layer and the second FC layer.

Referring to FIG. 4A, the CNN may receive the input image and transmit it to the convolution block 310 to acquire the feature map. Then the feature map may be relayed to the RPN 320 to generate the proposal boxes. For example, number of the proposal boxes generated by the RPN 320 may be three hundred, but it is not limited thereto.

Next, a tracking module 430 of the tracking network may receive information on the proposal boxes and may allow a tracker within the tracking module 430 to select at least one specific proposal box among the proposal boxes by referring to the L2 distance and/or the score of the respective proposal boxes as mentioned above. For example, if the number of the specific proposal box selected based on a distance from the reference box of the previous frame is ten, information on the rest of the proposal boxes which are unselected, i.e., untracked boxes, may be forwarded to the detection network. That is, information on two hundred and ninety untracked boxes are forwarded to the detection network.

Meanwhile, according to the tracking network, a first pooled feature map is generated by applying a pooling operation to an area, corresponding to the specific proposal box, on a feature map through a first pooling layer 440; and a first bounding box is generated by applying regression operation to the first pooled feature map through the FC layer 460.

On the other hand, according to the detection network, a second pooled feature map is generated by applying a pooling operation to areas, corresponding to the untracked boxes, on a feature map through a second pooling layer 450; and a second bounding box is acquired by applying regression operation to the second pooled feature map through the FC layer 460.

Figure 4B:
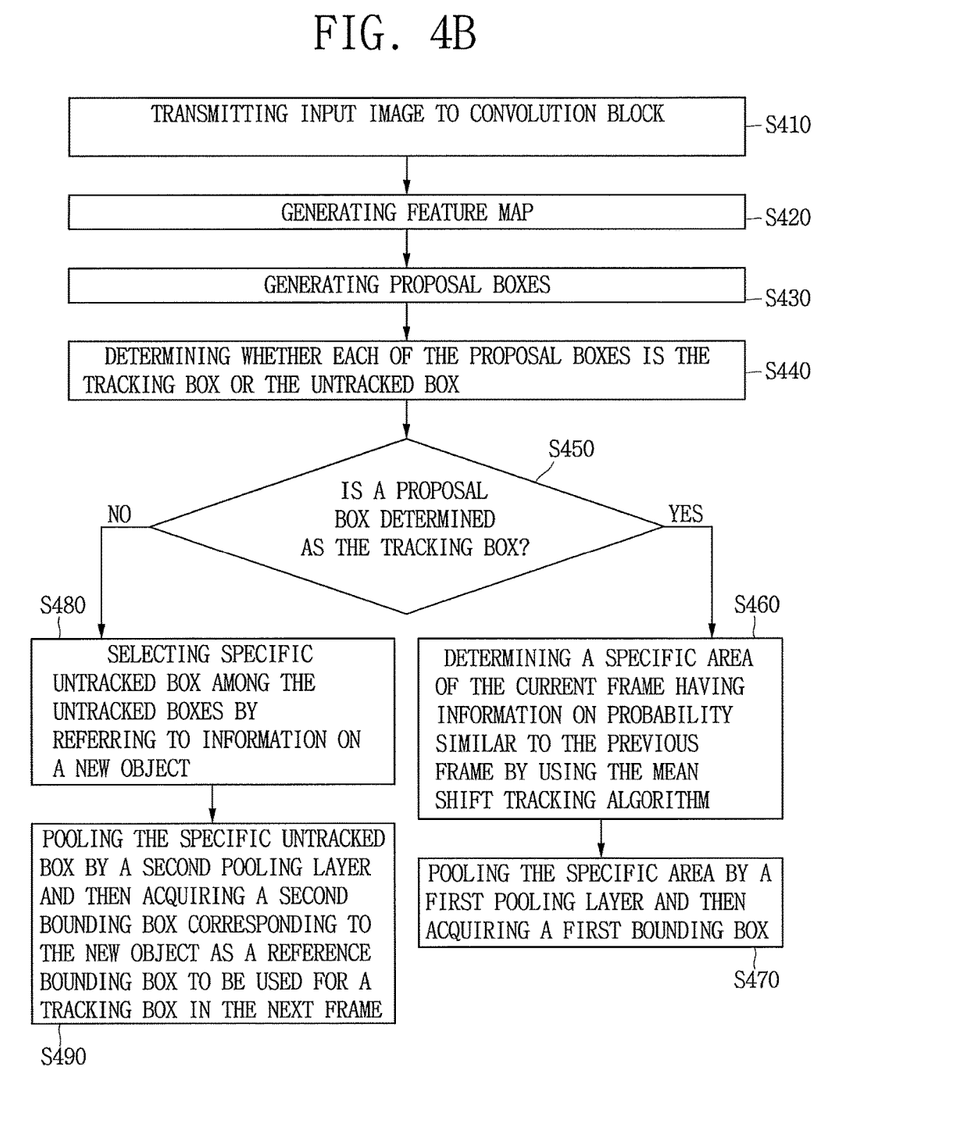
FIG. 4B is a flowchart showing processes of acquiring the bounding box by using the CNN including the tracking network and a detection network in accordance with another example embodiment of the present invention.

FIG. 4B is a flowchart showing processes of acquiring the bounding box by using the CNN including the tracking network and the detection network in accordance with another example embodiment of the present invention.

For a reference, due to the fact that the embodiments of the CNN in FIG. 3A and FIG. 4A may have the same configuration for the convolution block 310 and the RPN 320, the processes of transmitting the input image at a step of S410, generating the feature map at a step of S420, and generating the proposal boxes at a step of S430 in FIG. 4B are identical to those of S311, S312, and S321 described in FIG. 3B.

However, the process in FIG. 4B is different from that in FIG. 3B from the aspect that the process is performed not only for the tracking box but also for the untracked boxes. Herein, some of the multiple proposal boxes which have not been set as the tracking box among the proposal boxes are set as the untracked boxes, but it is not limited thereto. As another example, the untracked boxes may be selected among the proposal boxes according to one or more certain conditions.

For reference, as the process of determining the tracking box by using the mean shift tracking algorithm has been explained above, the detailed explanation thereon will be omitted.

The testing device 200 may determine whether each of the proposal boxes is the tracking box or the untracked box at a step of S440.

If a proposal box is determined as the tracking box at a step of S450, the testing device 200 may adjust a position of the tracking box by using the mean shift tracking algorithm at a step of S460. In detail, the testing device 200 determines a specific area of the current frame, having information on probability similar to that corresponding to pixel data of the object in the previous frame, as a target area of the tracking box by using the mean shift tracking algorithm at the step of S460. Thereafter, the testing device 200 generates the first pooled feature map by pooling the specific area through the first pooling layer 440 and then acquires the first bounding box by applying regression operation to the first pooled feature map through the FC layer 460 at a step of S470.

Otherwise, if a proposal box is determined as the untracked box at a step of S450, the testing device 200 may allow the second pooling layer 450 to generate the second pooled feature map by applying pooling operation to an area, corresponding to at least one of the multiple untracked boxes, on the feature map; and, if the FC layer 460 detects a new object by applying classification operation to the second pooled feature map, allows the FC layer 460 to acquire the second bounding box by applying regression operation to the second pooled feature map at a step of S490.

For another example, before the step of S490, the testing device 200 may select at least one specific untracked box among the multiple untracked boxes by referring to at least either of (i) each of L2 distances between the reference bounding box acquired from the previous frame and each of the multiple untracked boxes and (ii) each of scores as probability values which indicates a probability of each of the multiple untracked boxes including the object, at a step of S480. If the step of S480 is performed, the testing device 200 may allow the second pooling layer 450 to generate the second pooled feature map by applying pooling operation to an area, corresponding to the specific untracked box, on the feature map; and, if the FC layer 460 detects the new object by applying classification operation to the second pooled feature map, allow the FC layer 460 to acquire the second bounding box by applying regression operation to the second pooled feature map at the step of S490.

Herein, the testing device 200 may determine the second bounding box corresponding to the new object as a reference bounding box NEW_REF to be used for a tracking box of the new object included in a next frame and then set a tracking box in the next frame by referring to each distance between the reference bounding box NEW_REF and each of multiple proposal boxes in the next frame.

For reference, a result of the classification operation provides information on probabilities of the object being respective kinds of identity. The classification operation may represent a probability of the object being a vehicle, that being a passenger, that being a background, and that being a road, and the like.

Figure 5:
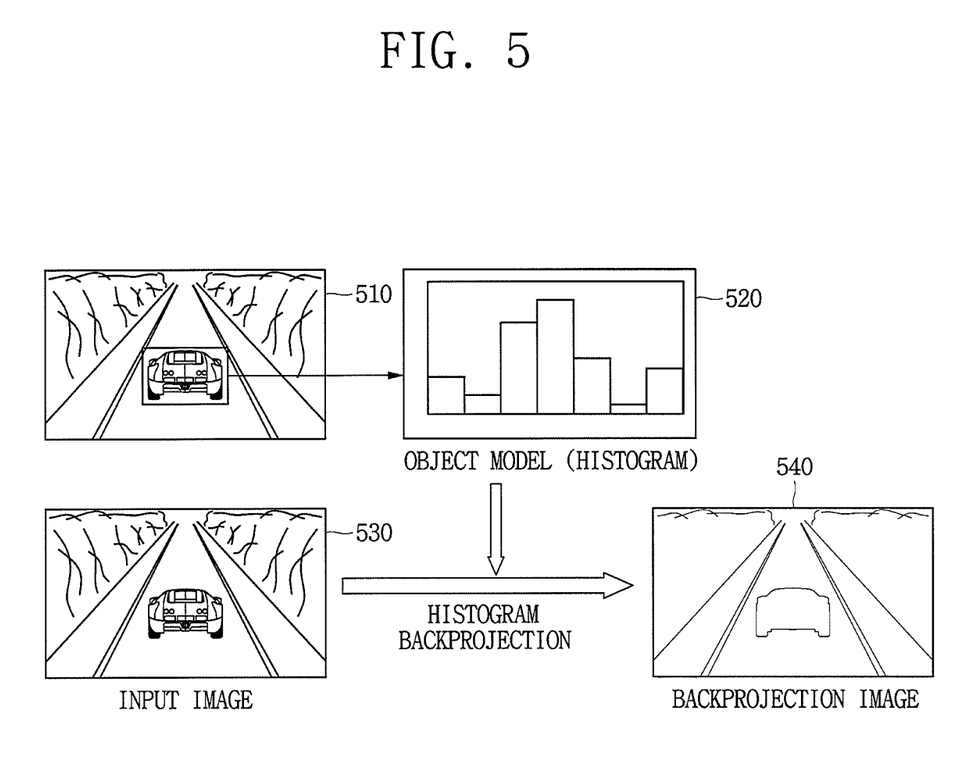
FIG. 5 is a drawing illustrating a mean shift tracking algorithm used in the present invention.

FIG. 5 is a drawing for explaining the mean shift tracking algorithm used in the present invention.

By referring to FIG. 5, a histogram 520 of an object, e.g., a vehicle, to be tracked may be obtained from a specific are 510. The histogram is information on probability data acquired by counting each number of pixels included in an area of the object for each color and dividing each number of pixels by the number of total pixels.

On condition that the histogram 520 is acquired, an input image 530 is back-projected to acquire a back-projection image 540. Herein, the back-projection is a course of digitizing how many color values of the pixels in the input image 530 are included in the object to be tracked. If a histogram of a model is called as Hm and if color values of each pixel x of the input image I 530 is called as I(x), then values of the back-projection may be obtained as shown in a formula $w(x)=Hm(I(x))$.

The mean shift tracking algorithm may be applied to the values of the back-projection. More specifically, since the mean shift tracking algorithm tracks an object in an image by using mean shift capable of finding a center of data distribution to be moved from a current position, it is used to find the specific area in the current frame, having information on probability similar to that corresponding to pixel data of the object in the previous frame, to be moved from the starting area of the tracking box, in the present invention.

For reference, information on probability data corresponding to the pixel data of the object in the previous frame may be a histogram corresponding to pixel data of the first bounding box in the previous frame and/or pixel data of the second bounding box therein.

Meanwhile, before the processes of the testing device 200 are performed, at least one parameter of the CNN included in the testing device 200 may be adjusted by a learning device (not illustrated).

In detail, on conditions that the learning device has completed processes of (i) allowing convolutional layers to acquire a feature map for training from a training image including an object for training, (ii) allowing the RPN to acquire one or more proposal boxes for training corresponding to the object for training in the training image, (iii) allowing the pooling layer to generate a pooled feature map for training corresponding to the proposal boxes for training by applying pooling operation, (iv) allowing the FC layer to acquire information on pixel data of a bounding box for training by applying the regression operation to the pooled feature map for training, and (v) allowing a loss layer to acquire comparative data by comparing between the information on pixel data of the bounding box in the training image and that in a GT image, thereby adjusting at least one parameter of the CNN by using the comparative data during backpropagation process, the testing device 200 may performs the above-described steps.

For reference, information on pixel data of the bounding box for training may be acquired through both the first FC layer and the second FC layer, as the case may be. As explained above, if the tracking network including the first FC layer and the detection network including the second FC layer are configured as one network, it will not be necessary to respectively perform the learning course to the first and the second FC layer. In this case, parameters of the first FC layer may have same values to those of the second FC layer.

In accordance with the present invention, there is an effect of acquiring the bounding box of high precision corresponding to the object in the image.

In accordance with the present invention, there is an effect of tracking the object more accurately by using the mean-shift tracking algorithm.

In accordance with the present invention, there is an effect of increasing reliability of tracking results along with validation results by making the tracking network reuse a classifier and a regressor included in the detection network in the CNN.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled artisan in a pertinent field. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language codes made by a complier but also a high level codes that can be used by an interpreter etc., which is executed by a computing device. The aforementioned hardware device can work as more than a software module to perform the technical features of the present invention and they can do the same in the opposite case.

As seen above, the present invention has been specifically described by such matters as detailed components, limited embodiments, and drawings. While the invention has been shown and described with respect to the preferred embodiments, it, however, may be appreciated by those skilled in the art that various changes and modifications may be made without departing from the spirit and the scope of the present invention as defined in the following claims.

Accordingly, the thought of the present invention must not be confined to the explained preferred or example embodiments, and the following patent claims as well as everything including variations equal or equivalent to the patent claims pertain to the category of the thought of the present invention.

What is claimed is:

1. A method for acquiring at least one bounding box corresponding to at least one object in a test image by using a CNN including a tracking network, comprising steps of:
   (a) a testing device acquiring or supporting another device to acquire multiple proposal boxes, if feature map is generated as a result of applying convolution operation to the test image as a current frame, and then information on the multiple proposal boxes by applying certain operation to the feature map by a Region Proposal Network (RPN) is outputted;
   (b) the testing device selecting or supporting another device to select at least one specific proposal box among the multiple proposal boxes by referring to at least either of (i) a result of comparing each distance between a reference bounding box of the object in a previous frame and each of the multiple proposal boxes and (ii) a result of comparing each of scores as probability values which indicates whether each of the proposal boxes includes the object, and then setting or another device to set the specific proposal box as a starting area of a tracking box, wherein the starting area is used for a mean shift tracking algorithm;
   (c) the testing device determining or supporting another device to determine a specific area of the current frame having information on probability similar to that corresponding to pixel data of the object in the previous frame as a target area of the tracking box by using the mean shift tracking algorithm; and
   (d) the testing device allowing a pooling layer to generate a pooled feature map by applying pooling operation to an area in the feature map corresponding to the specific area and then allowing a FC layer to acquire a bounding box by applying regression operation to the pooled feature map.

2. The method of claim 1, wherein, at the step of (c), the information on probability corresponding to pixel data of the object in the previous frame is a histogram corresponding to pixel data of the bounding box in the previous frame.

3. The method of claim 1, further comprising a step of:
   (e) the testing device determining the bounding box as a reference bounding box to be used for a tracking box of the object to be located in a next frame.

4. The method of claim 1, wherein, at the step of (b), if the number of the object is plural, the testing device selects or supports another device to select the specific proposal boxes among the multiple proposal boxes by referring to at least either of (i) the result of comparing each of distances between the reference bounding box of the object in the previous frame and each of the multiple proposal boxes and (ii) the result of comparing each of the scores as probability values which indicates whether each of the proposal boxes includes the object, and then setting or another device to set each of the specific proposal boxes as each starting area of each of the tracking boxes.

5. The method of claim 1, wherein, at the step of (b), a distance between the reference bounding box of the object located in the previous frame and each of the multiple proposal boxes is L2 distance between the center coordinate of the reference bounding box and that of each of the multiple proposal boxes.

6. The method of claim 1, wherein, on conditions that a learning device has completed processes of (i) allowing convolutional layers to acquire a feature map for training from a training image including an object for training, (ii) allowing the RPN to acquire one or more proposal boxes for training corresponding to the object for training in the training image, (iii) allowing the pooling layer to generate a pooled feature map for training corresponding to the proposal boxes for training by applying pooling operation, (iv) allowing the FC layer to acquire information on pixel data of a bounding box for training by applying the regression operation to the pooled feature map for training, and (v) allowing a loss layer to acquire comparative data by comparing between the information on pixel data of the bounding box in the training image and that in a GT image, thereby adjusting at least one parameter of the CNN by using the comparative data during backpropagation process, the testing device performs the steps of (a) to (d).

7. The method of claim 1, wherein, at the step of (d), the testing device acquires or supports another device to acquire the bounding box with a size being adjusted to correspond to the object in the test image by processes of generating the pooled feature map and then applying the regression operation through the FC layer.

8. A method for acquiring bounding boxes corresponding to objects in a test image by using a CNN including a tracking network and a detection network, comprising steps of:
  (a) a testing device acquiring or supporting another device to acquire multiple proposal boxes, if feature map is generated as a result of applying convolution operation to the test image as a current frame, and then information on the multiple proposal boxes by applying certain operation to the feature map by a Region Proposal Network (RPN) is outputted;
  (b) the testing device (b-1) selecting or supporting another device to select at least one specific proposal box among the multiple proposal boxes by referring to at least either of (i) a result of comparing each distance between a reference bounding box of the object in a previous frame and each of the multiple proposal boxes and (ii) a result of comparing each of scores as probability values which indicates whether each of the proposal boxes includes the object, and then setting or another device to set the specific proposal box as a starting area of a tracking box, wherein the starting area is used for a mean shift tracking algorithm; and (b-2) setting or supporting another device to set at least some of the proposal boxes which have not been set as the tracking box among the multiple proposal boxes as multiple untracked boxes; and
  (c) (c-1) the testing device, after the step of (b-1), determining or supporting another device to determine a specific area of the current frame having information on probability similar to that corresponding to pixel data of the object in the previous frame as a target area of the tracking box by using the mean shift tracking algorithm; and allowing a first pooling layer to generate a first pooled feature map by applying pooling operation to an area in the feature map corresponding to the specific area and then allowing a FC layer to acquire a first bounding box by applying regression operation to the first pooled feature map; and (c-2) the testing device, after the step of (b-2), allowing a second pooling layer to generate a second pooled feature map by applying pooling operation to an area on the feature map corresponding to at least one of the multiple untracked boxes; and, if the FC layer detects a new object by applying classification operation to the second pooled feature map, allowing the FC layer to acquire a second bounding box by applying regression operation to the second pooled feature map.

9. The method of claim 8, wherein, at the step of (c-2), the testing device determines the second bounding box corresponding to the new object as a reference bounding box to be used for a tracking box of the new object included in a next frame.

10. The method of claim 8, wherein, at the step of (b-2), at least one specific untracked box is selected among the multiple untracked boxes by referring to at least either of (i) each of L2 distances between the reference bounding box acquired from the previous frame and each of the multiple untracked boxes and (ii) each of scores as probability values which indicates whether each of the multiple untracked boxes includes the object, and wherein, at the step of (c-2), the testing device allows the second pooling layer to generate the second pooled feature map by applying pooling operation to an area on the feature map corresponding to the specific untracked box; and, if the FC layer detects the new object by applying classification operation to the second pooled feature map, allows the FC layer to acquire the second bounding box by applying regression operation to the second pooled feature map.

11. A testing device for acquiring at least one bounding box corresponding to at least one object in a test image by using a CNN including a tracking network, comprising:
  a communication part for acquiring the test image or feature map converted therefrom; and
  a processor for performing processes of (I) acquiring or supporting another device to acquire multiple proposal boxes, if the feature map is acquired as a result of applying convolution operation to the test image as a current frame, and then information on the multiple proposal boxes by applying certain operation to the feature map by a Region Proposal Network (RPN) is outputted; (II) selecting or supporting another device to select at least one specific proposal box among the multiple proposal boxes by referring to at least either of (i) a result of comparing each distance between a reference bounding box of the object in a previous frame and each of the multiple proposal boxes and (ii) a result of comparing each of scores as probability values which indicates whether each of the proposal boxes includes the object, and then setting or another device to set the specific proposal box as a starting area of a tracking box, wherein the starting area is used for a mean shift tracking algorithm; (III) determining or supporting another device to determine a specific area of the current frame having information on probability similar to that corresponding to pixel data of the object in the previous frame as a target area of the tracking box by using the mean shift tracking algorithm; and (IV) allowing a pooling layer to generate a pooled feature map by applying pooling operation to an area in the feature map corresponding to the specific area and then allowing a FC layer to acquire a bounding box by applying regression operation to the pooled feature map.

12. The testing device of claim 11, wherein, at the process of (III), the information on probability corresponding to pixel data of the object in the previous frame is a histogram corresponding to pixel data of the bounding box in the previous frame.

13. The testing device of claim 11, wherein the processor further performs a process of: (V) determining the bounding box as a reference bounding box to be used for a tracking box of the object to be located in a next frame.

14. The testing device of claim 11, wherein, at the process of (II), if the number of the object is plural, the processor selects or supports another device to select the specific proposal boxes among the multiple proposal boxes by referring to at least either of (i) the result of comparing each of distances between the reference bounding box of the object in the previous frame and each of the multiple proposal boxes and (ii) the result of comparing each of the scores as probability values which indicates whether each of the proposal boxes includes the object, and then setting or another device to set each of the specific proposal boxes as each starting area of each of the tracking boxes.

15. The testing device of claim 11, wherein, at the process of (II), a distance between the reference bounding box of the object located in the previous frame and each of the multiple proposal boxes is L2 distance between the center coordinate of the reference bounding box and that of each of the multiple proposal boxes.

16. The testing device of claim 11, wherein, on conditions that a learning device has completed processes of (i) allowing convolutional layers to acquire a feature map for training from a training image including an object for training, (ii) allowing the RPN to acquire one or more proposal boxes for training corresponding to the object for training in the training image, (iii) allowing the pooling layer to generate a pooled feature map for training corresponding to the proposal boxes for training by applying pooling operation, (iv) allowing the FC layer to acquire information on pixel data of a bounding box for training by applying the regression operation to the pooled feature map for training, and (v) allowing a loss layer to acquire comparative data by comparing between the information on pixel data of the bounding box in the training image and that in a GT image, thereby adjusting at least one parameter of the CNN by using the comparative data during backpropagation process, the processor of the testing device performs the processes of (I) to (IV).

17. The testing device of claim 11, wherein, at the process of (IV), the processor acquires or supports another device to acquire the bounding box with a size being adjusted to correspond to the object in the test image by processes of generating the pooled feature map and then applying the regression operation through the FC layer.

18. A testing device for acquiring bounding boxes corresponding to objects in a test image by using a CNN including a tracking network and a detection network, comprising:
a communication part for acquiring the test image or feature map converted therefrom; and
a processor for performing processes of (I) acquiring or supporting another device to acquire multiple proposal boxes, if the feature map is generated as a result of applying convolution operation to the test image as a current frame, and then information on the multiple proposal boxes by applying certain operation to the feature map by a Region Proposal Network (RPN) is outputted; (II) (II-1) selecting or supporting another device to select at least one specific proposal box among the multiple proposal boxes by referring to at least either of (i) a result of comparing each distance between a reference bounding box of the object in a previous frame and each of the multiple proposal boxes and (ii) a result of comparing each of scores as probability values which indicates whether each of the proposal boxes includes the object, and then setting or another device to set the specific proposal box as a starting area of a tracking box, wherein the starting area is used for a mean shift tracking algorithm; and (II-2) setting or supporting another device to set at least some of the proposal boxes which have not been set as the tracking box among the multiple proposal boxes as multiple untracked boxes; and (III) (III-1) after the process of (II-1), determining or supporting another device to determine a specific area of the current frame having information on probability similar to that corresponding to pixel data of the object in the previous frame as a target area of the tracking box by using the mean shift tracking algorithm; and allowing a first pooling layer to generate a first pooled feature map by applying pooling operation to an area in the feature map corresponding to the specific area and then allowing a FC layer to acquire a first bounding box by applying regression operation to the first pooled feature map; and (III-2) the testing device, after the process of (II-2), allowing a second pooling layer to generate a second pooled feature map by applying pooling operation to an area on the feature map corresponding to at least one of the multiple untracked boxes; and, if the FC layer detects a new object by applying classification operation to the second pooled feature map, allowing the FC layer to acquire a second bounding box by applying regression operation to the second pooled feature map.

19. The testing device of claim 18, wherein, at the process of (III-2), the processor determines the second bounding box corresponding to the new object as a reference bounding box to be used for a tracking box of the new object included in a next frame.

20. The testing device of claim 18, wherein, at the process of (II-2), at least one specific untracked box is selected among the multiple untracked boxes by referring to at least either of (i) each of L2 distances between the reference bounding box acquired from the previous frame and each of the multiple untracked boxes and (ii) each of scores as probability values which indicates whether each of the multiple untracked boxes includes the object, and wherein, at the process of (III-2), the processor allows the second pooling layer to generate the second pooled feature map by applying pooling operation to an area on the feature map corresponding to the specific untracked box; and, if the FC layer detects the new object by applying classification operation to the second pooled feature map, allows the FC layer to acquire the second bounding box by applying regression operation to the second pooled feature map.

* * * * *